US012678984B2

(12) United States Patent
Danielsson et al.

(10) Patent No.: US 12,678,984 B2
(45) Date of Patent: Jul. 14, 2026

(54) RAZOR CARTRIDGE

(71) Applicant: Planet Earth Razors AB, Stockholm (SE)

(72) Inventors: Mats Danielsson, Täby (SE); Sam Hacohen, Haifa (IL); Shlomo Zucker, Mikhmoret (IL)

(73) Assignee: Planet Earth Razors AB, Stockholm (SE)

( * ) Notice: Subject to any disclaimer, the term of this patent is extended or adjusted under 35 U.S.C. 154(b) by 732 days.

(21) Appl. No.: 17/963,383

(22) Filed: Oct. 11, 2022

(65) Prior Publication Data

US 2024/0116203 A1 Apr. 11, 2024

(51) Int. Cl.
*B26B 21/22* (2006.01)
*B26B 21/40* (2006.01)

(52) U.S. Cl.
CPC ........ *B26B 21/222* (2013.01); *B26B 21/4068* (2013.01)

(58) Field of Classification Search
CPC . B26B 21/4012; B26B 21/222; B26B 21/227; B26B 21/4068
See application file for complete search history.

(56) References Cited

U.S. PATENT DOCUMENTS 3,783,510 A * 1/1974 Dawidowicz ......... B26B 21/222 30/40
3,940,853 A * 3/1976 Francis ................... B26B 21/24 30/52
4,200,976 A * 5/1980 Gooding ............... B26B 21/222 219/121.13

(Continued)

FOREIGN PATENT DOCUMENTS

CA 1252005 A 4/1989
CA 2261320 A1 8/2000

(Continued)

OTHER PUBLICATIONS

Razor Revamp Service (https://www.razoremporium.com/razor-revamp-service/) [retrieved on Mar. 8, 2022].

(Continued)

*Primary Examiner* — Boyer D Ashley
*Assistant Examiner* — Fernando A Ayala
(74) *Attorney, Agent, or Firm* — Morgan, Lewis & Bockius LLP

(57) ABSTRACT

An aspect of the invention relates to a razor cartridge comprising a housing, a bottom cover comprising multiple steps and multiple razor blade assemblies. Each razor blade assembly is arranged on a respective step of the multiple steps and comprises a blade support and a razor blade attached to the blade support. The blade support comprises a first main surface and an opposite second main surface and at least one upwardly protruding member and at least one downwardly protruding member. The at least one upwardly protruding member of at least one razor blade assembly is configured to engage a second main surface of a blade support of an adjacent razor blade assembly. The at least one downwardly protruding member of at least one razor blade assembly is configured to engage a first main surface of a blade support of an adjacent razor blade assembly.

24 Claims, 7 Drawing Sheets

(56) References Cited

U.S. PATENT DOCUMENTS

| | | | | |
|---|---|---|---|---|
| 4,389,773 | A * | 6/1983 | Nissen | B26B 21/22 30/32 |
| 4,480,387 | A | 11/1984 | d'Alayer de Costemore d'Arc | |
| 4,562,644 | A * | 1/1986 | Hitchens | B26B 21/44 30/41 |
| 4,937,940 | A | 7/1990 | Mason | |
| 5,224,267 | A | 7/1993 | Simms et al. | |
| 5,359,774 | A * | 11/1994 | Althaus | B26B 21/4018 30/32 |
| 5,365,958 | A | 11/1994 | Stuhlmacher, II | |
| 5,374,813 | A | 12/1994 | Shipp | |
| 5,557,851 | A | 9/1996 | Ortiz | |
| 5,661,907 | A * | 9/1997 | Apprille, Jr. | B26B 21/4012 30/47 |
| 5,822,862 | A * | 10/1998 | Ferraro | B26B 21/227 30/47 |
| 6,161,288 | A * | 12/2000 | Andrews | B26B 29/00 30/527 |
| 6,506,106 | B2 | 1/2003 | Fletcher | |
| 6,550,141 | B1 * | 4/2003 | Rivers | B26B 21/4018 30/50 |
| 6,886,211 | B2 | 5/2005 | Severino | |
| 6,969,299 | B1 | 11/2005 | Papetti | |
| 7,104,874 | B1 | 9/2006 | Gussack et al. | |
| 7,142,118 | B2 | 11/2006 | Hamilton et al. | |
| 7,263,738 | B2 | 9/2007 | Moore | |
| 8,056,240 | B2 * | 11/2011 | Harris, II | B26B 21/20 30/70 |
| 9,168,104 | B2 | 10/2015 | Dein | |
| 9,457,486 | B2 * | 10/2016 | Coresh | B26B 21/4031 |
| 10,252,829 | B2 | 4/2019 | Coleman et al. | |
| 10,722,018 | B2 | 7/2020 | Kelly | |
| 11,000,960 | B1 | 5/2021 | Hooberman | |
| 11,117,280 | B2 * | 9/2021 | Zucker | B26B 21/22 |
| 11,166,535 | B2 | 11/2021 | Lam | |
| 11,254,022 | B1 | 2/2022 | Hooberman | |
| 11,338,321 | B2 | 5/2022 | Yu et al. | |
| 2002/0145058 | A1 | 10/2002 | Tziviskos | |
| 2003/0055753 | A1 | 3/2003 | Dellar et al. | |
| 2004/0128835 | A1 * | 7/2004 | Coffin | B26B 21/14 30/527 |
| 2004/0177511 | A1 * | 9/2004 | Miyazaki | B26B 21/22 30/346.5 |
| 2004/0181949 | A1 * | 9/2004 | Coffin | B26B 21/446 30/50 |
| 2005/0101231 | A1 | 5/2005 | Sekerich | |
| 2005/0172494 | A1 | 8/2005 | Aviza et al. | |
| 2006/0283487 | A1 | 12/2006 | Grabowski | |
| 2008/0006311 | A1 | 1/2008 | Brown et al. | |
| 2009/0000426 | A1 | 1/2009 | Anderson et al. | |
| 2009/0113716 | A1 * | 5/2009 | Wain | B26B 21/4068 30/346.59 |
| 2010/0139103 | A1 | 6/2010 | Miyazaki | |
| 2015/0217468 | A1 * | 8/2015 | Dryfhout | B26B 21/16 132/200 |
| 2016/0279816 | A1 * | 9/2016 | Bruno | B26B 21/222 |
| 2017/0066147 | A1 | 3/2017 | Ball et al. | |
| 2018/0192757 | A1 | 7/2018 | Lam | |
| 2018/0264663 | A1 | 9/2018 | Treu et al. | |
| 2019/0299457 | A1 * | 10/2019 | Long | B26B 21/4012 |
| 2021/0370535 | A1 | 12/2021 | Zucker | |

FOREIGN PATENT DOCUMENTS

| | | | |
|---|---|---|---|
| CN | 101950389 | A | 1/2011 |
| CN | 201780584 | U | 3/2011 |
| CN | 111104995 | A | 5/2020 |
| DE | 102006001559 | A1 | 7/2007 |
| EP | 2707180 | B1 | 12/2016 |
| JP | 2010-282250 | A | 12/2010 |
| KR | 10-2020-0075135 | A | 6/2020 |
| WO | 2017/032561 | A2 | 3/2017 |

OTHER PUBLICATIONS

Straight Razor Restoration Services (https://shavesmith.com/product/straight-razor-restoration-services/) [retrieved on Mar. 8, 2022].

International Search Report dated Nov. 28, 2023, issued in corresponding International Patent Application No. PCT/SE2023/050999.

* cited by examiner

RAZOR CARTRIDGE

TECHNICAL FIELD

The present invention generally relates to razors, and in particular to a razor cartridge designed to enable dismantle and re-mantling of razor blade assemblies from and into the razor cartridge.

BACKGROUND

There is a general trend of recycling or reusing consumer products to reduce waste from the consumer products and emission of greenhouse gases in connection with production. One area where this is particularly interesting is within personal grooming care. Most men, and many women, shave parts of their facial and/or body hair on a regular basis. While some consumers use electric razors or entirely disposable ones, the majority of consumers use refill cartridge razors, i.e., a reusable handle that is fitted with a new razor cartridge when the previous one is worn out.

The razor cartridge generally consists of plastic polymer and rubber components in addition to the stainless-steel razors. The razor cartridges may be, depending on the design of the razor cartridges, very hard to dismantle into individual components by the consumers. It is therefore very hard to recycle the different materials of the razor cartridges in an efficient way. As a consequence, in the best scenario, the used razor cartridges end up in waste facilities for energy production or are used as landfills. The everyday consumption of razor cartridges thereby leads to large emissions during the entire chain from material sourcing, production, transportation and up to disposal.

The razor blades as such are most often not worn out when a consumer disposes a razor cartridge. This means that the razor blades could be re-used several times rather than being disposed if they could be refurbished. There is therefore a need for a razor cartridge that is designed to enable dismantling of razor blades from the housing of the razor cartridge to enable refurbishment of the dismantled razor blades and, following refurbishment, re-mantling of the razor blades into the housing.

SUMMARY

It is a general objective to provide a razor cartridge designed to enable dismantle and re-mantling of razor blade assemblies from and into the razor cartridge.

This and other objectives are met by embodiments as disclosed herein.

An aspect of the invention relates to a razor cartridge comprising a housing, a bottom cover comprising multiple steps, and multiple razor blade assemblies. Each razor blade assembly of the multiple razor blade assemblies is arranged on a respective step of the multiple steps. Each razor blade assembly comprises a blade support and a razor blade attached to the blade support. The blade support comprises a first main surface and a second main surface opposite to the first main surface and at least one upwardly protruding member and at least one downwardly protruding member. The at least one upwardly protruding member of at least one razor blade assembly of the multiple razor blade assemblies is configured to engage a second main surface of a blade support of an adjacent razor blade assembly of the multiple razor blade assemblies. The at least one downwardly protruding member of at least one razor blade assembly of the multiple razor blade assemblies is configured to engage a first main surface of a blade support of an adjacent razor blade assembly of the multiple razor blade assemblies.

The razor cartridge can be dismantled and re-mantled to allow for refurbishment, such as re-sharpening and/or re-coating, of the razor blades of the razor blade assemblies. Hence, the razor blades can thereby re-used following refurbishment or be replaced if deemed not appropriate for refurbishment while then reusing the remaining components of the razor cartridge. As a consequence, the razor cartridge contributes to reducing waste for consumer products as compared to disposable razor cartridges.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The present invention generally relates to a razor cartridge designed to enable dismantle and re-mantling of razor blade assemblies from and into the razor cartridge.

Figure 1C:
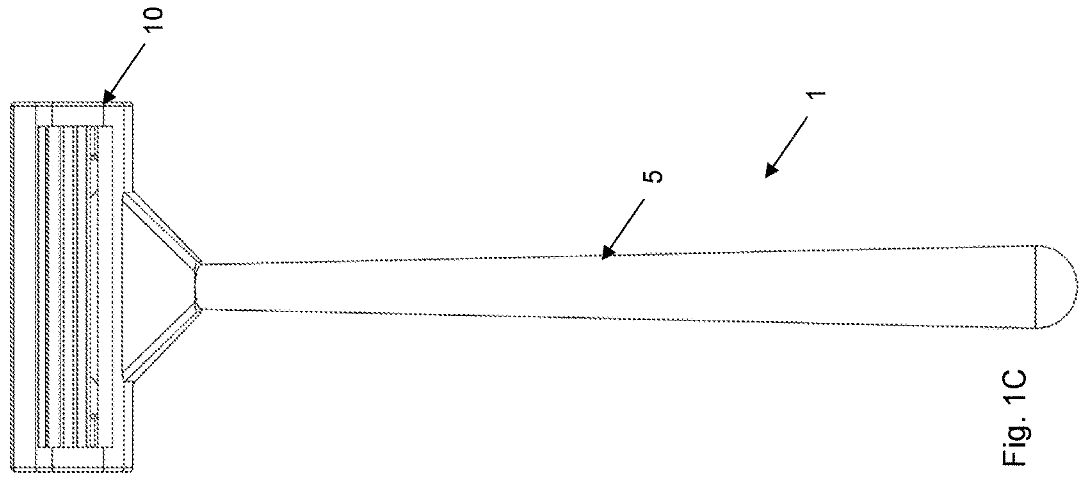
FIGS. 1A to 1C illustrate different views of a razor comprising a handle and a razor cartridge according to an embodiment.

Razors are used by a large portion of the adult population, both men and women, for personal grooming care. Razors come in two main versions, electric razors and non-electric razors. The latter ones could be entirely disposable but the majority of these razors are so-called refill cartridge razors 1 as schematically shown in FIGS. 1 to 1C. Such a refill cartridge razor 1 basically consists of a reusable handle 5 that is fitted with a new razor cartridge 10 when the old one is worn out.

Although such refill cartridge razors 1 are generally more environmentally friendly as compared to disposable razors in the long run due to the re-use of the handle 5 and thereby merely exchanging razor cartridges 10, they still have an impact on the environment since they are hard to recycle or dispose in an environmentally friendly way. The reason for this is that the razor cartridge 10 consists of different parts made of different materials. Generally, a razor cartridge 10 comprises a plastic cartridge housing, body or base, one or more razor blades typically made of stainless steel, a retention spring for the razor blades, which is often in metal, a rubber strip, a hydration strip and a plastic cartridge holder that attaches the razor cartridge 10 to the re-usable handle 5. The various materials of the components of the razor cartridge 10 make it very had, if not impossible, to disable and recycle the razor cartridge 10 after usage for the consumer.

In the best scenario, the used razor cartridge ends up in facilities for waste to energy management or directly transferred to landfills.

The components of the razor cartridge 10 are most often not worn out once the consumer disposes the razor cartridge 10. Hence, the razor cartridge 10 could be re-used if refurbished. In such a case, the razor cartridge 10 is preferably dismantlable in terms of allowing removal of the razor blade or blades of the razor cartridge 10 to refurbish the razor blade or blades and then re-assemble the refurbished razor blade or blades back into the razor cartridge 10. Such a razor cartridge 10 thereby enables its razor blade or blades to be re-sharpened and/or re-coated, such as by applying a new polytetrafluoroethylene (PTFE) or TEFLON® coating onto the edges of the razor blade or blades. The so re-sharpened and/or re-coated razor blade or blades could thereby be reused and mantled back into the razor cartridge 10. This means that the razor cartridge 10 can still be used by the user rather than being discarded.

The razor cartridge 10 of the invention comprises razor blade assemblies 7 that are arranged in the razor cartridge 10 in such a way that they can be dismantled from the razor cartridge 10 and then be arranged back into razor cartridge 10 following refurbishment of the razor blades 30 in the razor blade assemblies 7.

With reference to the drawings, an aspect of the invention relates to razor cartridge 10 comprising a housing 20, a bottom cover 50 and multiple razor blade assemblies 7, 7A-7C. The bottom cover 50 comprises multiple steps 52, 52A-52C. Each razor blade assembly 7, 7A-7C of the multiple razor blade assemblies 7, 7A-7C is arranged on a respective step 52, 52A-52C of the multiple steps 52, 52A-52C. Furthermore, each razor blade assembly 7, 7A-7C comprises a blade support 40, 40A-40C and a razor blade 30, 30A-30C attached to the blade support 40, 40A-40C. The blade support 40, 40A-40C comprises a first main surface 41 and a second main surface 42 opposite to the first main surface 41. The blade support 40, 40A-40C also comprises at least one upwardly protruding member 43 and at least one downwardly protruding member 44A, 44B.

The at least one upwardly protruding member 43 of at least one razor blade assembly 7, 7B, 7C of the multiple razor blade assemblies 7, 7A-7C is configured to engage a second main surface 41 of a blade support 40, 40A, 40B of an adjacent razor blade assembly 7, 7A, 7B of the multiple razor blade assemblies 7, 7A-7C. Furthermore, the at least one downwardly protruding member 44A, 44B of at least one razor blade assembly 7, 7A, 7B of the multiple razor blade assemblies 7, 7A-7C is configured to engage a first main surface 42 of a blade support 40, 40B, 40C of an adjacent razor blade assembly 7, 7B, 7C of the multiple razor blade assemblies 7, 7A-7C.

Figure 3A:
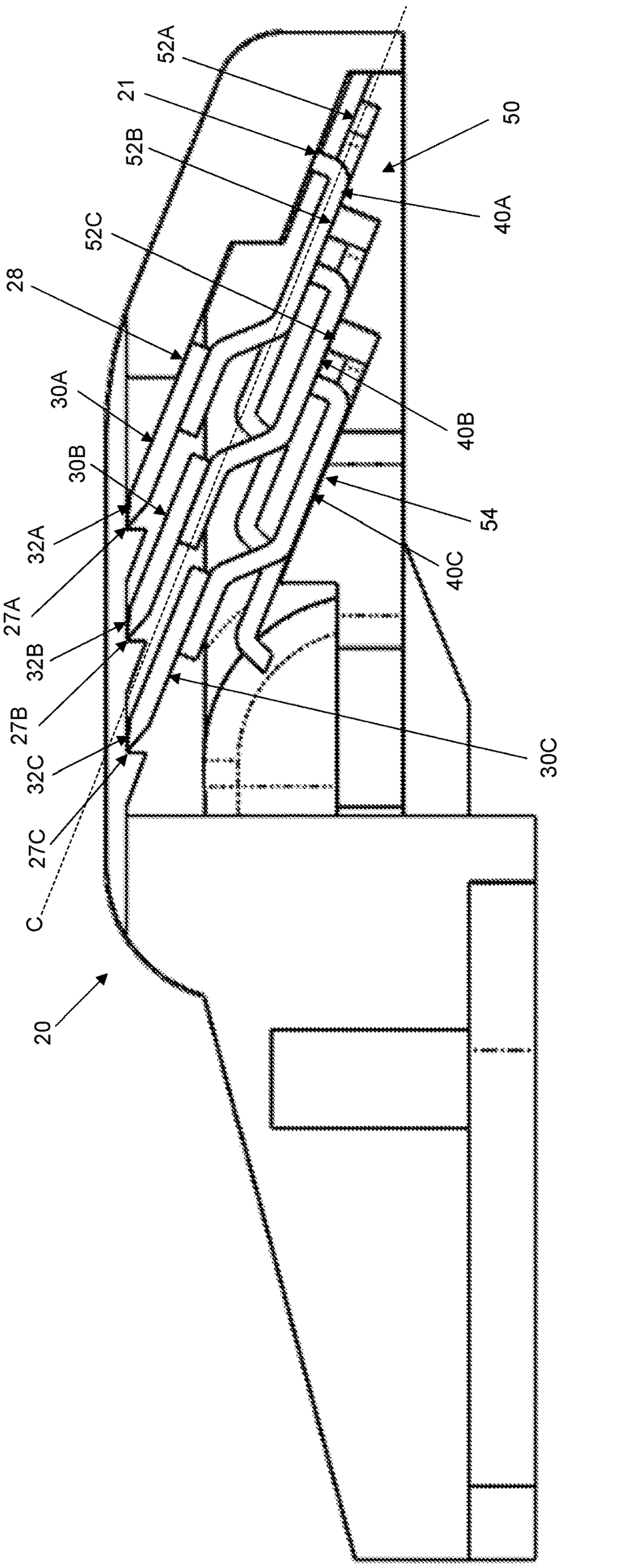
FIGS. 3A and 3B are cross-sectional views of the razor cartridge according to an embodiment.
Figure 3B:
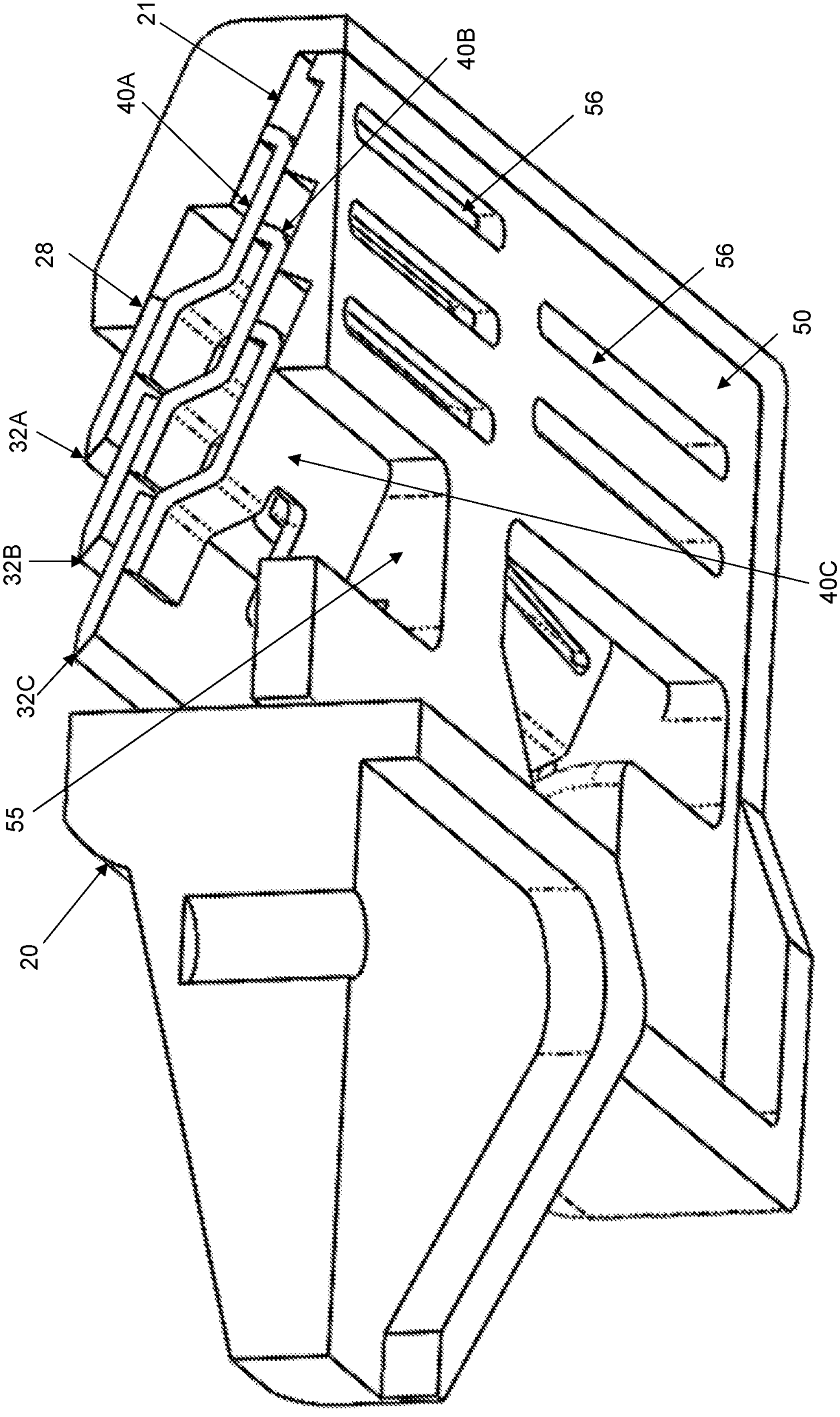

As is best seen in FIGS. 3A and 3B, the bottom cover 50 comprises multiple, i.e., at least two, steps 52A-52C, preferably one such step 52A-52C per razor blade assembly 7A-7C in the razor cartridge 10. The razor blade assemblies 7A-7C are then supported by these steps 52A-52C through their blade supports 40A-40C resting on the steps 52A-52C with at least a portion of the second main surface 42 of the blade supports 40A-40C engaging a respective step 52A-52C and thereby being supported by the respective step 52A-52C.

The at least one upwardly protruding member 43 and the at last one downwardly protruding member 44A, 44B of the blade supports 40A-40C are configured to engage adjacent blade supports 40A-40C when the razor blade assemblies 7A-7C are arranged on the steps 52A-52C. The upwardly and downwardly protruding members 43, 44A, 44B thereby support the razor blade assemblies 7A-7C by defining a respective distance between the razor blade assemblies 7A-7C in the razor cartridge 10 and thereby defining a respective distance between the razor blades 30A-30C and the razor edges 32A-32C. The distance between razor blades 30A-30C and the razor edges 32A-32C at least partly defined by the upwardly and downwardly protruding members 43, 44A, 44B allows water to flow through the razor blades 30A-30C during cleaning of the razor cartridge 10 and thereby reduces the risk of capturing cut hair parts and other debris in the housing 20 of the razor cartridge 10.

In an embodiment, the razor cartridge 10 comprises an intermediate razor blade assembly 7B arranged between a first adjacent razor blade assembly 7A and a second adjacent razor blade assembly 7C. In such an embodiment, the at least one upwardly protruding member 43 of the intermediate razor blade assembly 7B is configured to engage a second main surface 41 of a blade support 40A of the first adjacent razor blade assembly 7A. Correspondingly, the at least one downwardly protruding member 44A, 44B of the intermediate razor blade assembly 7B is configured to engage a first main surface 42 of a blade support 40C of the second adjacent razor blade assembly 7C.

In this embodiment, the razor cartridge 10 comprises at least three, preferably three, razor blade assemblies 7A-7C denoted first adjacent razor blade assembly 7A, intermediate razor blade assembly 7B and second adjacent razor blade assembly 7C above. Adjacent herein refers to that the adjacent razor blade assemblies 7A, 7C are adjacent the intermediate razor blade assembly 7B. Alternatively, the three razor blade assemblies 7A-7C could be denoted first razor blade assembly 7A, second razor blade assembly 7B and third razor blade assembly 7C. In such a case, the at least one upwardly protruding member 43 of the second razor blade assembly 7B is configured to engage the second main surface 41 of the blade support 40A of the first razor blade assembly 7A. Correspondingly, the at least one downwardly protruding member 44A, 44B of the second razor blade assembly 7B is configured to engage the first main surface 42 of the blade support 40C of the third razor blade assembly 7C.

In a particular embodiment, the at least one upwardly protruding member 43 of the first adjacent razor blade assembly 7A (first razor blade assembly 7A) is configured to engage a support surface 21 of the housing 20, also referred to as first support surface 21 of the housing 20 herein. The at least one downwardly protruding member 44A, 44B of this first adjacent razor blade assembly 7A (first razor blade assembly 7A) is configured to engage a first main surface 42 of a blade support 40B of the intermediate razor blade assembly 7B (second razor blade assembly 7B).

In another particular embodiment, the at least one upwardly protruding member 43 of the second adjacent razor blade assembly 7C (third razor blade assembly 7C) is configured to engage a second main surface 41 of a blade support 40B of the intermediate razor blade assembly 7B (second razor blade assembly 7B).

In an embodiment, the bottom cover 50 preferably comprises a support surface 54 configured to engage and support a second main surface 41 of the blade support 40C of the second adjacent razor blade assembly 7C (third razor blade assembly 7C).

Figures 6A, 6B:
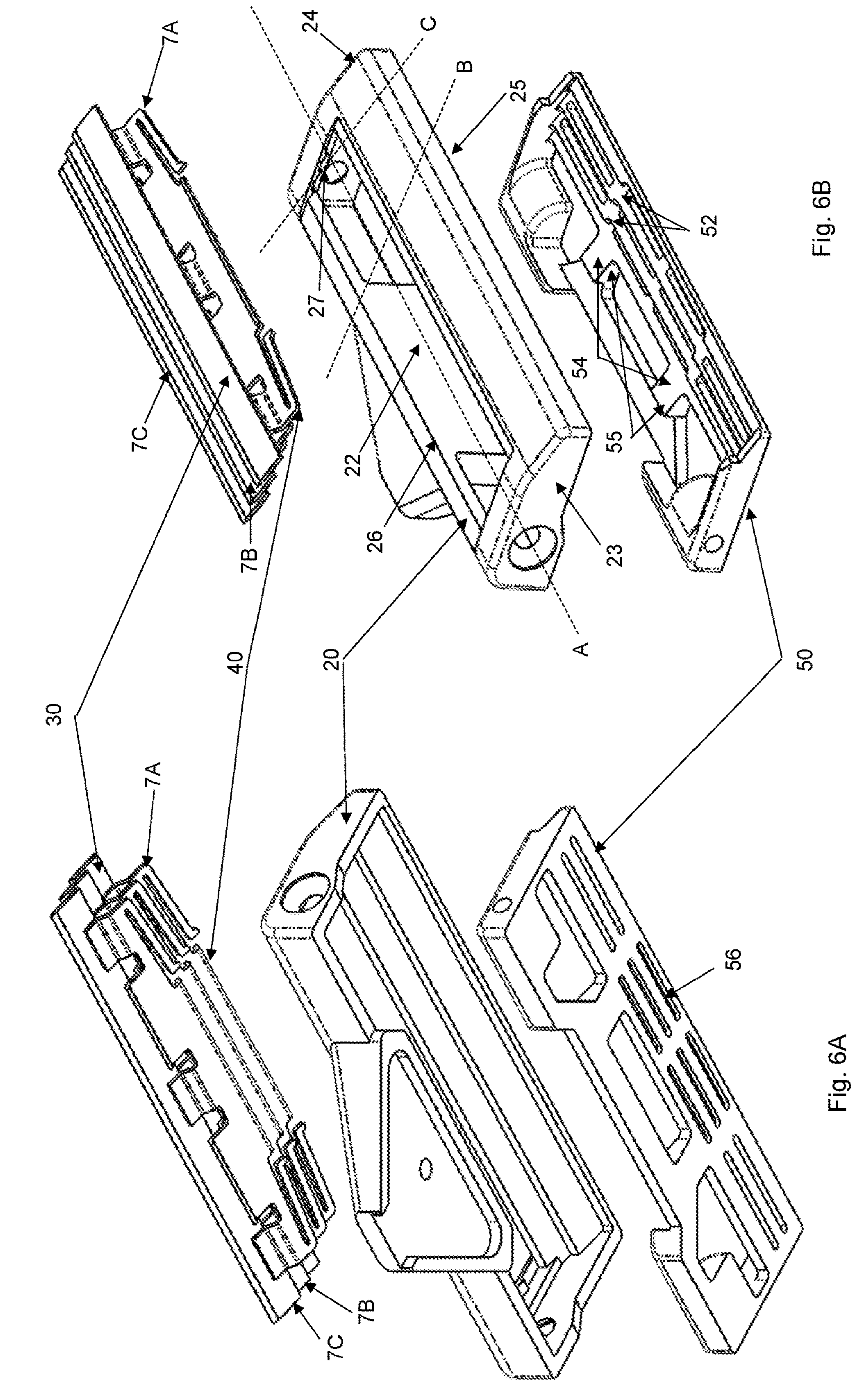
FIGS. 6A and 6B are exploded views showing razor blade assemblies (top), housing (middle) and bottom cover (bottom) as seen from below (A) and above (B).

Hence, in a preferred embodiment, the multiple razor blade assemblies 7A-7C are sandwiched between a support surface 54 of the bottom cover 50 and a support surface 21 of the housing 20 forming a stack of partly displaced razor blade assemblies 7A-7C. The upwardly and downwardly protruding members 43, 44A, 44B then keep the multiple razor blade assemblies 7A-7C and their included razor blades 30A-30C distanced from each other in the stack. Furthermore, the upwardly and downwardly protruding members 43, 44A, 44B arrange the razor blades 30A-30C substantially parallel to each other with the razor edges 32A-32C directed in substantially the same direction along the axis C as shown in FIGS. 3A and 6B.

In an embodiment, the housing 20 also comprises a second support surface 28 that is configured to engage at least a portion of the razor blade 30A of the first adjacent razor blade assembly 7A (first razor blade assembly 7A).

The razor blade assemblies 7A-7C are arranged in the razor cartridge 10 by first placing the third razor blade assembly 7C on the third or lowest step 52C of the bottom cover 50 so that the support surface 54 of a support structure 55 in the bottom cover 50 engages the second or lower main surface 41 of the blade support 40C of the third razor blade assembly 7C. The third razor blade assembly 7C thereby rests on and is supported by the third or lowest step 52C and the support structure 55. The second razor blade assembly 7B is then placed on the second or intermediate step 52B of the bottom cover 50. The at least one upwardly protruding member 43 of the third razor blade assembly 7C will then engage and support the second or lower main surface 41 of the blade support 40B of the second razor blade assembly 7B, while the at least one downwardly protruding member 44A, 44B of the second razor blade assembly 7B engages and is supported by the first or upper main surface 42 of the third razor blade assembly 7C. Finally, the first razor blade assembly 7A is pushed in between the second razor blade assembly 7B and the housing 20. In such a case, the at least one upwardly protruding member 43 of the second razor blade assembly 7B will engage and support the second or lower main surface 41 of the blade support 40A of the first razor blade assembly 7A, while the at least one downwardly protruding member 44A, 44B of the first razor blade assembly 7A engages and is supported by the first or upper main surface 42 of the second razor blade assembly 7B. The upwardly protruding member 43 of the first razor blade assembly 7A is then configured to engage the first support surface 21 of the housing 20 while at least a portion of the razor blade 30A of the first razor blade assembly 7A is configured to engage the second support surface 28 of the housing 20.

The razor cartridge 10 of the invention is, however, not limited to having three razor blade assemblies 7A-7C and three razor blades 30A-30C. The razor cartridge 10 could, alternatively, have fewer razor blade assemblies 7, i.e., two razor blade assemblies 7, or more than three razor blade assemblies 7A-7C, such as four or five such razor blade assemblies 7.

In the former case, the at least one upwardly protruding member 43 of a first razor blade assembly is configured to engage the first support surface 21 of the housing 20, whereas at least a portion of the razor blade 30A of the first razor blade assembly is configured to engage the second support surface 28 of the housing 20. The at least one downwardly protruding member 44A, 44B of the first razor blade assembly is configured to engage the first main surface 42 of the blade support of a second razor blade assembly. The at least one upwardly protruding member 43 of the razor blade assembly is configured to the second main surface 41 of the first razor blade assembly, while the support surface 54 of the support structure 55 in the bottom cover 50 is configured to engage and support the second main surface 41 of the blade support of the second razor blade assembly. In this case, the bottom cover 50 comprises two steps 52.

In the latter case, the razor cartridge 10 comprises multiple, i.e., at least two, intermediate razor blade assemblies 7B in addition to the first or upper razor blade assembly 7A and the third or lower razor blade assembly 7C. The bottom cover 50 then comprises more than three steps 52, such as four or five steps if the razor cartridge comprises four or five razor blade assemblies 7.

In a particular embodiment, the at least one upwardly protruding member 43 protrudes a same distance from the first main surface 42 as the at least one downwardly protruding member 44A, 44B protrudes from the second main surface 41. In such a particular embodiment, the razor blades 30A-30C of the razor blade assemblies 7A-7C will be arranged substantially parallel to each other in the housing 20 and with substantially a same distance between adjacent razor blades 30A-30C.

Hence, the upwardly and downwardly protruding members 43, 44A, 44B enable the multiple razor blade assemblies 7A-7C to be arranged on the multiple steps 52A-52C of the bottom cover 50 to position each razor blade 30A-30C at a distance relative adjacent razor blade or blades 30A-30C. Preferably, the distance or gap between each razor blade 30A-30C and the adjacent razor blade or blades 30A-30C is the same as the distance that the at least one upwardly protruding member 43 protrudes from the first main surface 42 and the at least one downwardly protruding member 44A, 44B protrudes from the second main surface 41.

The upwardly and downwardly protruding members 43, 44A, 44B are configured to provide slidable contact with the second and first main surfaces 41, 42 or the first support surface 21 of the housing 21. Correspondingly, the second support surface 28 of the housing 21 provides a slidable contact with the at least a portion of the razor blade 30A of the first razor blade assembly 7A and the support structure 55 of the bottom cover 50 provides a slidable contact with the second main surface 41 of the blade support 40C of the third razor blade assembly 7C.

Slidable contact as used herein implies that the multiple razor blade assemblies 7A-7C are movable relative to each other and also relative to the housing 20 and the bottom cover 50. Hence, in an embodiment, each razor blade assembly 7A-7C of the multiple razor blade assemblies 7A-7C is independently movable relative to another blade assembly 7A-7C of the multiple razor blade assemblies 7A-7C.

The relative movement of the razor blade assemblies 7A-7C relative to each other and further preferably also relative to the housing 20 and the bottom cover 50 is along an axis C parallel to the extension of the razor blades 30A-30C, the blade supports 40A-40C and the razor blade assemblies 7A-7C, see FIGS. 3A and 6B.

This relative and independent movement of the razor blade assemblies 7A-7C and their razor blades 30A-30C means that the razor blades 30A-30C will adjust to the contours of the skin of a user during shaving. This is possible by the slidable contacts achieved by the upwardly and downwardly protruding members 43, 44A, 44B.

In an embodiment, the razor blade assemblies 7A-7C are furthermore biased or preloaded (spring loaded) by at least one respective spring member 47A, 47B configured to engage a respective step 52A-52C in the bottom cover 50 to provide a bias or preload of the razor blade assemblies 7A-7C in the direction of the razor edges 32A-32C of the razor blades 30A-30C.

Hence, in an embodiment, the blade support 40A-40C comprises at least one spring member 47A, 47B configured to engage a step 52A-52C of the multiple steps 52A-52C. The at least one spring member 47A, 47B there provides a spring force in the direction of the razor edges 32A-32C of the razor blades 30A-30C thereby pushing the razor blade assemblies 7A-7C and the razor blades 30A-30C towards the upper part of the housing 20 and an elongated blade receiving region 22 of the housing 20. This spring force means that the razor edges 32A-32C will always be in correct position relative to the housing 20 to achieve a smooth shaving experience even after re-sharpening of the razor blades 30A-30C.

Generally, the razor blades 30A-30C in a new razor cartridge 10 have substantially a same size and thereby extension along the axis C shown in FIG. 3A. However, if the razor blades 30A-30C are refurbished, including re-sharpened, the razor blades 30A-30C may over time have different sizes. The at least one spring member 47A, 47B compensates for this change in size of the razor blades 30A-30C following re-sharpening by pushing the razor blades 30A-30C and thereby the razor edges 32A-32C towards the upper part of the housing 20 and the elongated blade receiving region 22. This means that the razor edges 32A-32C will thereby be correctly positioned relative to the housing 20 and have substantially the same blade exposure even after re-sharpening.

In an embodiment, the at least one spring member 47A, 47B comprises at least one elongated segment 48A, 48B forming at least one laterally extending slotted opening 49A, 49B in the blade support 40A-40C.

In an embodiment, each blade support 40A-40C comprise two spring members 47A, 47B, preferably in the form of two elongated segments 48A, 48B forming two laterally extending slotted openings 49A, 49B in the blade support 40A-40C. In such a case, the elongated segments 48A, 48B are formed such that a free end 48C, 48D of the elongated segments 48A, 48B extends laterally and outwardly from the blade support 40A-40C.

The elongated segments 48A, 48B extending laterally and outwardly from the blade support 40A-40C act like springs when engaging steps 52A-52C of the bottom cover 50 to push the blade support 40A-40C and the attached razor blades 30A-30C away from the steps 52A-52C and towards the upper part of the housing 20 and the elongated blade receiving region 22.

In a particular embodiment, the at least one upwardly protruding member 43 of the blade support 40A-40C is arranged between the two spring members 47A, 47B.

Figure 4A:
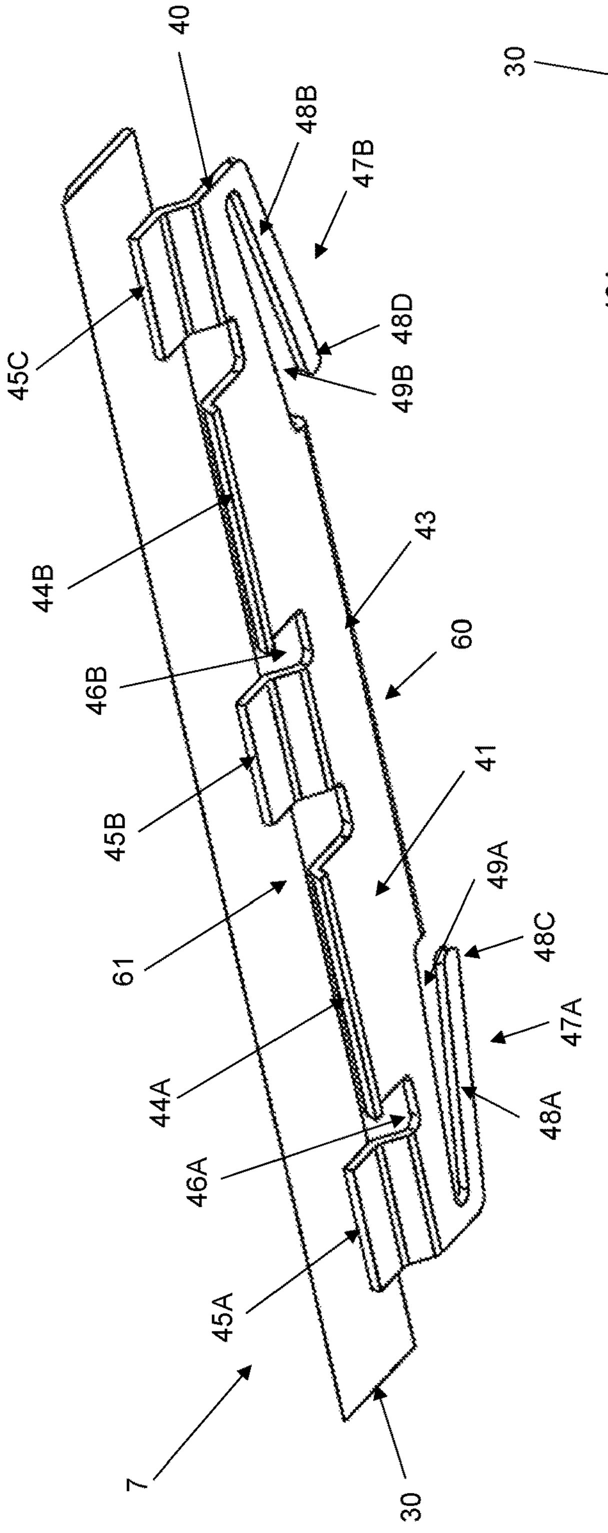
FIGS. 4A and 4B illustrate a razor blade assembly according to an embodiment as seen from below (A) and above (B)
Figure 4B:
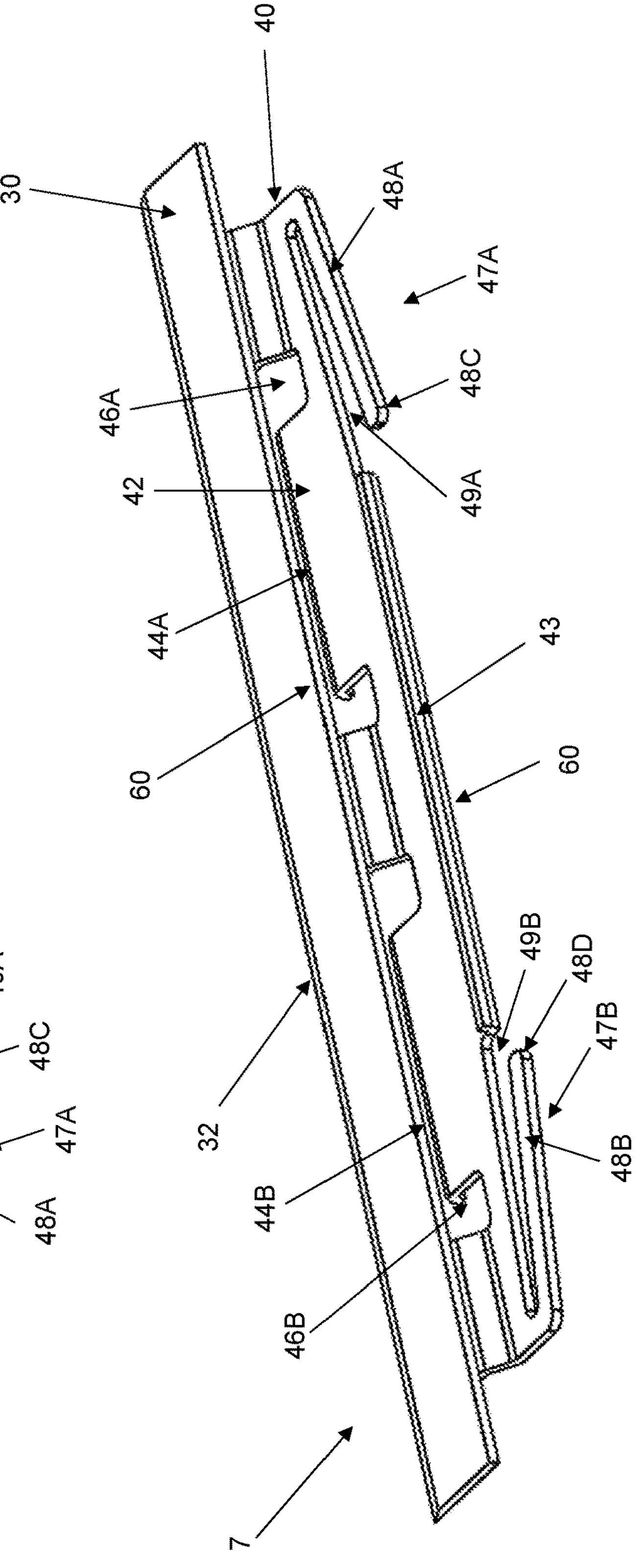

An advantage of having the at least one spring member 47A, 47B attached to the razor blade 30 through the blade support 40, such as shown in FIGS. 4A and 4B, is that the exposure of each razor blade 30A, 30B, 30C in the razor cartridge 10 can be individually controlled. This is a significant advantage as compared to razor cartridges where the razor blades in the form of spring fingers. Blade exposure as used herein is the amount of the blade cutting edge 32 are exposed beyond the housing 20.

In an embodiment, the housing 20 comprises an elongated blade receiving region 22 defined between two end walls 23, 24 spaced from each other along a first axis A and between two side walls 25, 26 spaced from each other along a second axis B perpendicular to the first axis A. In this embodiment, the housing 20 also comprises blade-receiving slots 27, 27A-27C in the end walls 23, 24 extending along a third axis C that is perpendicular to the first axis A and angled at an angle larger than 0° but smaller than 90° to the second axis B, see FIG. 6B.

In such an embodiment, the edge portions of the razor blades 30A-30C are received in the blade-receiving slots 27A-27C. These blade-receiving slots 27A-27C thereby prevent or restrict the razor blades 30A-30C from being pushed by the spring members 47A, 47B past the correct position of the razor edges 32A-32C relative to the upper part of the housing 20 and the elongated blade receiving region 22. This means that the razor blades 30A-30C and the razor edges 32A-32C will be positioned correctly to achieve a smooth shaving even if the razor blades 30A-30C are re-sharpened.

In an embodiment, the multiple steps 52A-52C of the bottom cover 50 also extend along the third axis C. Hence, in this embodiment, the steps 52A-52C are substantially parallel with the blade receiving slots 27A-27C.

The above-mentioned third axis C that is angled relative to the second axis B has a non-zero angle that corresponds to the shaving angle of the razor edges 32A-32C of the razor blades 30A-30C. This non-zero angle is preferably larger than 0° but smaller than 45° to the second axis B, preferably selected within an interval of from 5° up to 35°, more preferably selected within an interval of from 10° up to 30°, and even more preferably selected within an interval of from 15° up to 25°, such as about 20°.

In an embodiment, the blade support 40A-40C comprises a first side 60 configured to face a step 52A-52C of the multiple steps 52A-52C and a second side 61 opposite to the first side 60. In such an embodiment, the at least one upwardly protruding member 43 is arranged in connection with the first side 60 and the at least one downwardly protruding member 44A, 44B is arranged in connection with the second side 61.

In another embodiment, the at least one upwardly protruding member 43 is arranged in connection with the second side 61 and the at least one downwardly protruding member 44A, 44B is arranged in connection with the first side 60.

The upwardly and downwardly protruding members 43, 44A, 44B can be achieved by various structures, preferably in connection with the respective sides 60, 61 of the blade supports 40A-40C. For instance, the upwardly protruding members 43 could be in the form of a respective structure attached to the first main surfaces 42 (or the second main surface 41) of the blade supports 40A-40C, while the downwardly protruding members 42 could be in the form of a respective structure attached to the second main surfaces 41 (or the first main surface 42) of the blade supports 40A-40C. The structures then protrude away from the first and main surfaces 41, 42 of the blade supports 40A-40C.

In another embodiment, at least a portion of the first side 60 (or the second side 61) of the blade support 40A-40C is bent to form the at least one upwardly protruding member 43 and at least a portion of the second side 61 (or the first side 60) of the blade support 40A-40C is bent to form the at least one downwardly protruding member 44A, 44B. Hence, in this embodiment, at least one portion of the respective side 60, 61 of the blade support 40A-40C is bent to protrude upward past the first main surface 42 or protrude downward past the second main surface 41.

In an embodiment, the blade support 40A-40C comprises at least one support member 45A-45C attached to the razor blade 30A-30C. In a particular embodiment, the at least one support member 45A-45C extends from the second side 61 of the blade support 40A-40C.

In an embodiment, the blade support 40A-40C comprises multiple support members 45A-45C and multiple downwardly protruding members 44A, 44B. In a preferred embodiment, the blade support 40A-40C comprises alternating support members 45A-45C and downwardly protruding members 44A, 44B.

For instance, the blade support 40A-40C could comprise 2k+1 support members 45A-45C and 2k downwardly protruding members 44A, 44B or 2k+1 downwardly protruding members 44A, 44B and 2k support members 45A-45C. In such an embodiment, k is an integer equal to or larger than one, preferably one to three, more preferably one or two, and most preferably one. As an example, the blade support 40A-40C could comprise three support members 45A-45C and two downwardly protruding members 44A, 44B as shown in FIGS. 4A and 4B, or three downwardly protruding members 44A, 44B and two support members 45A-45C. In the former case, the downwardly protruding members 44A, 44B are interposed between adjacent support members 45A-45C, whereas in the latter case the support members 45A-45C are interposed between adjacent downwardly protruding members 44A, 44B.

The razor blades 30A-30C are then attached to the support members 45A-45C, preferably though the respective lower main surface of the razor blades 30A-30C. The razor blades 30A-30C may, for instance, be attached to the support members 45A-45C through welding, such as laser welding.

Figure 5A:
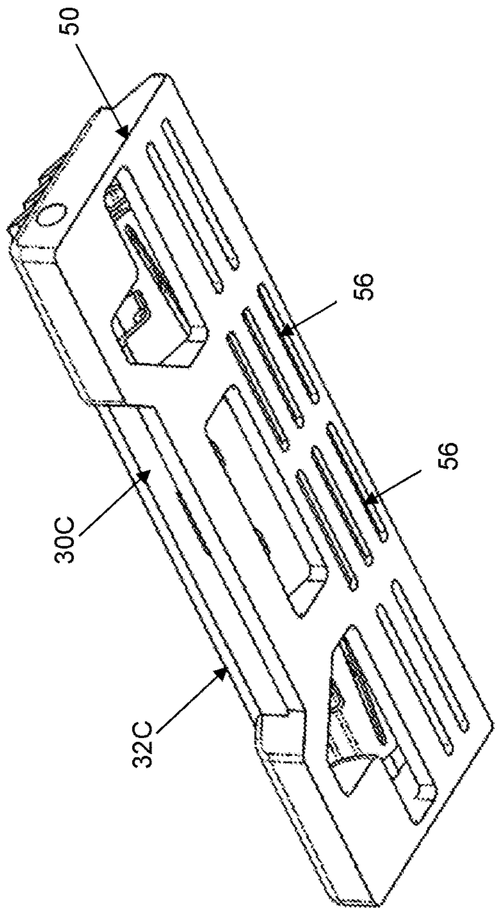
FIGS. 5A and 5B illustrate razor blade assemblies mounted on a bottom cover according to an embodiment as seen from above (A) and below (B)
Figure 5B:
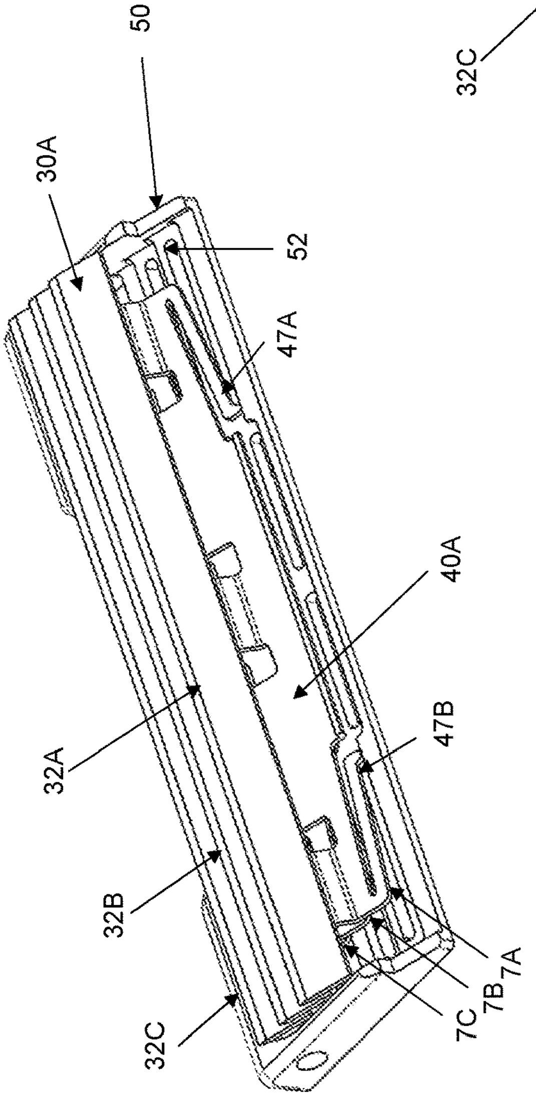

In a particular embodiment, the blade support 40A-40C comprises slotted openings 46A, 46B between adjacent support members 45A-45C and downwardly protruding members 44A, 44B. These slotted openings 46A, 46B thereby provide passages for water, cut hair and other debris during cleaning of the razor cartridge 10. This means that water can flow in between the razor blades 30A-30C and further through the slotted openings 46A, 46B and leave the razor cartridge 10 through channels 56 in the bottom cover 50. Hence, the bottom cover 50 preferably comprises at least one channel 56 extending through the thickness of the bottom cover 50. The at least one channel 56 preferably extend along at least a major part of the length of the bottom cover 50 as shown in FIG. 5B. Alternatively, multiple channels 56 could be provided, such as side by side, along the length of the bottom cover 50 so that each channel 56 then merely extends along a portion of the length of the bottom cover 50.

The design of the razor cartridge 10 allows for an efficient cleaning following use by providing passages for water during rinsing to flow between the razor blades 30A-30C through the slotted openings 46A, 46B between the support members 45A-45C and the downwardly protruding members 44A, 44B in the blade supports 40A-40C and further between the blade supports 40A-40C distanced from each other by the upwardly and downwardly protruding members 43, 44A, 44B and then leaving the razor cartridge 20 through the at least one, preferably multiple, channels 56 in the bottom cover 50.

Figure 1B:
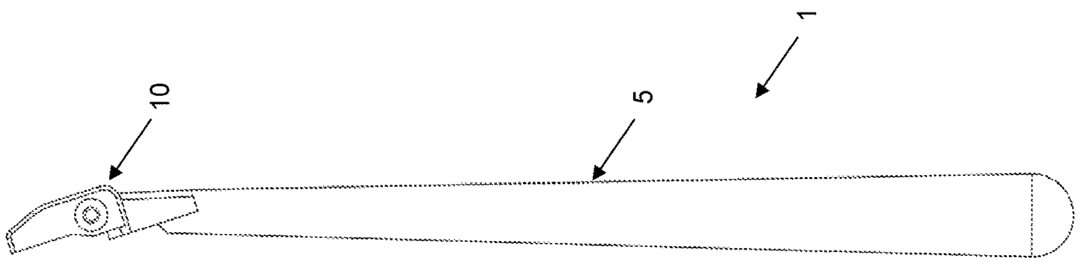

In an embodiment, the bottom cover 50 is releasably attached to the housing 20. This means that the bottom cover 50 can be released or removed from the housing 10 to thereby provide access to the included razor blade assemblies 7A-7C. The razor blade assemblies 7A-7C can then be retrieved from the opened razor cartridge 10 to refurbish the razor blades 30A-30C of the razor blade assemblies 7A-7C. The bottom cover 50 can be releasably attached to the housing 20 according to various embodiments. For instance, the housing 20 can include a respective opening 9 in both end walls 23, 24, see FIGS. 2A-2B, 6B. In such an embodiment, the bottom cover 50 comprises matching openings 3 in its end walls as shown in FIG. 6B. These matching openings 3 are then aligned with the openings 9 in the end walls 23, 24 of the housing 20, when the bottom cover 50 is attached to the housing 20. In a preferred embodiment, the matching openings 3 in the end walls of the bottom cover 50 are preferably threaded openings 3. In such a case, the bottom cover 50 could be secured to the housing 20 by a respective screw 7 inserted and screwed into the openings 9 and threaded openings 3 as shown in FIG. 1B. The bottom cover 50 can then be released from the housing 20 to access the razor blade assemblies 7A-7C provided therein by unscrewing the screws 7 and then remove the housing 20 from the bottom cover 50. The embodiments are, however, not limited to such a way to releasably attach the bottom cover 50 to the housing 20. Other examples include using snap-fit connectors. In such a case, the snap-fit locking mechanism could be an annular snap-fit lock, a torsional snap-fit lock or a cantilever snap-fit lock.

The refurbishment may, as mentioned in the foregoing, involve re-sharpening and/or re-coating the razor blades 30A-30C in addition to cleaning the razor blades 30A-30C. In such a refurbishment process, the bottom cover 50 is preferably removed from the housing 20 to access the razor blade assemblies 7A-7C. The razor edges 32A-32-C of the razor blades 30A-30C of the removed razor blade assemblies 7A-7C can then be re-sharpened and/or re-coated with PTFE to thereby enable continuous use of the razor blades 30A-30C. The razor blade assemblies 7A-7C with the refurbished razor blades 30A-30C can then be mounted back into the razor cartridge 10 and closing the razor cartridge 10 by mounting the bottom cover 50 onto the housing 20. In such a refurbishment process, individual razor blade assemblies may be replaced by a new razor blade assembly if the old razor blade assembly and its razor blade is not deemed suitable for further refurbishment and thereby being at the end of its service life.

The razor blades 30A-30C and the blade supports 40A-40C of the razor blade assemblies 7A-7C are preferably made of metal or metal alloys, such as stainless steel. The housing 20 and the bottom cover 50 are preferably made of plastics, such as polyethylene (PE), polypropylene (PP), acrylonitrile butadiene styrene (ABS) or indeed nylon with glass fibers. In such a case, the housing 20 and the bottom cover 50 could be made of the same or different plastic materials.

The razor cartridge 10 may optionally comprise other components traditionally included in razor cartridges 10 including, but not limited to, a rubber strip and/or a hydration strip.

Figure 1A:
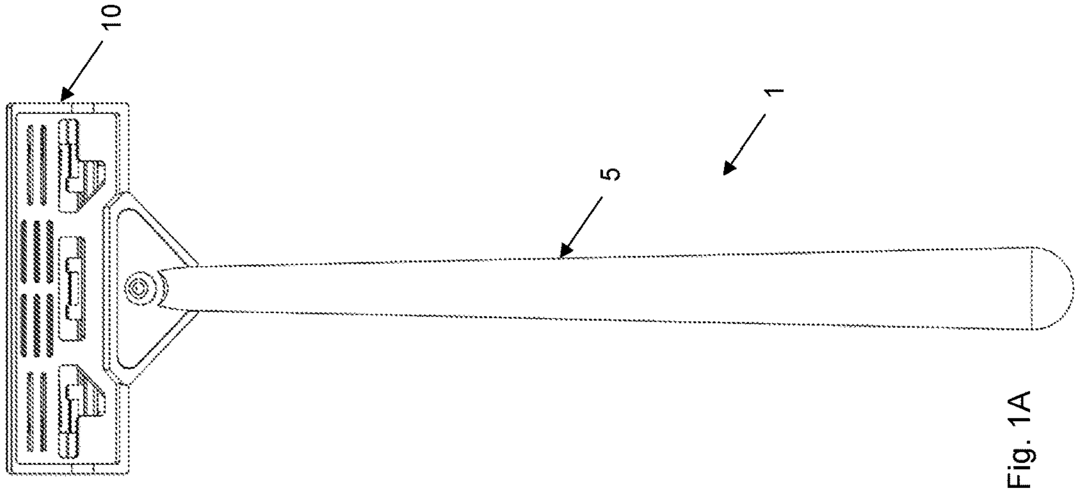

FIGS. 1A-1C schematically illustrates a razor blade 1 comprising a razor handle 5 and a razor cartridge 10 according to the invention connected to the razor handle 5.

Figure 2B:
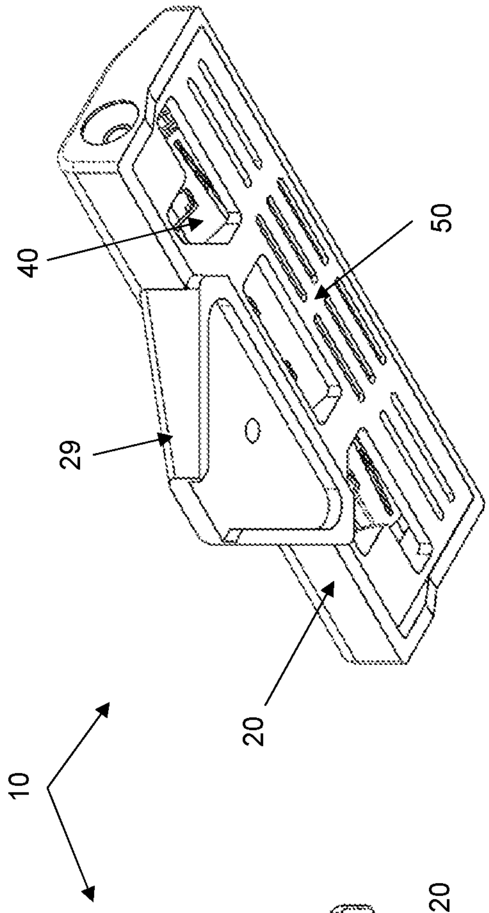
FIGS. 2A and 2B illustrate an assembled razor cartridge according to an embodiment as seen from above (A) and below (B)
Figure 2A:
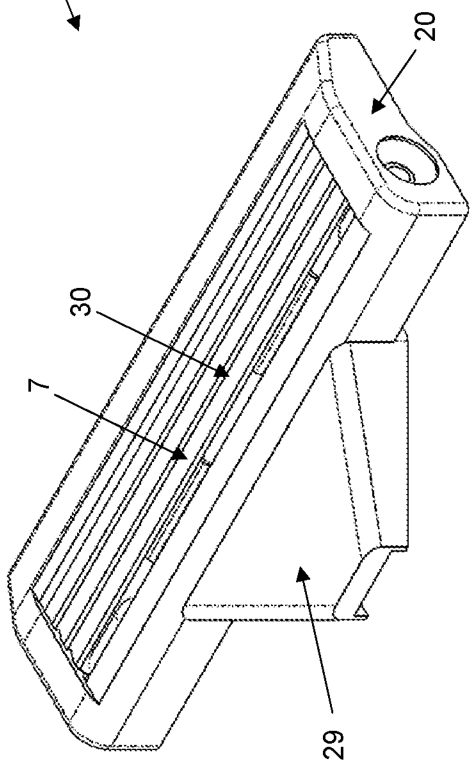

FIGS. 2A and 2B illustrate an assembled razor cartridge 10 according to an embodiment as seen from above (A) and below (B) showing the bottom cover 50 attached to the housing 20 with the razor blade assemblies 7 comprising a respective blade support 40 and an attached razor 30 provided in the razor cartridge 10. The figures also shows an adapter 29 connected to or forming part of the housing 20. This adapter 29 is configured to attach the razor cartridge 10 to a razor handle 5.

FIGS. 3A and 3B are cross-sectional views of the razor cartridge 10 according to an embodiment, whereas FIGS. 4A and 4B illustrate a razor blade assembly 7 according to an embodiment as seen from below (A) and above (B). FIGS. 5A and 5B illustrate razor blade assemblies 7A-7C mounted on a bottom cover 50 according to an embodiment as seen from above (A) and below (B).

FIGS. 6A and 6B are exploded views showing razor blade assemblies 7A-7C (top), housing 20 (middle) and bottom cover 50 (bottom) as seen from below (A) and above (B).

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A razor cartridge, comprising:
a housing;
a bottom cover comprising multiple steps; and
multiple razor blade assemblies, wherein each razor blade assembly of the multiple razor blade assemblies is arranged on a respective step of the multiple steps and comprises:
a blade support comprising;
a first main surface and a second main surface opposite to the first main surface; and
at least one upwardly protruding member and at least one downwardly protruding member; and
a razor blade attached to the blade support,
wherein the at least one upwardly protruding member of at least one razor blade assembly of the multiple razor blade assemblies is configured to engage a second main surface of a blade support of an adjacent razor blade assembly of the multiple razor blade assemblies,
wherein the at least one downwardly protruding member of at least one razor blade assembly of the multiple razor blade assemblies is configured to engage a first main surface of a blade support of an adjacent razor blade assembly of the multiple razor blade assemblies, and
wherein each razor blade assembly of the multiple razor blade assemblies is independently movable relative to another blade assembly of the multiple razor blade assemblies.

2. The razor cartridge according to claim 1, wherein
the multiple razor blade assemblies comprise an intermediate razor blade assembly, a first adjacent razor blade assembly and a second adjacent razor blade assembly;
the at least one upwardly protruding member of the intermediate razor blade assembly is configured to engage a second main surface of a blade support of the first adjacent razor blade assembly; and
the at least one downwardly protruding member of the intermediate razor blade assembly is configured to engage a first main surface of a blade support of the second adjacent razor blade assembly.

3. The razor cartridge according to claim 2, wherein
the at least one upwardly protruding member of the first adjacent razor blade assembly is configured to engage a support surface of the housing; and
the at least one downwardly protruding member of the first adjacent razor blade assembly is configured to engage a first main surface of a blade support of the intermediate razor blade assembly.

4. The razor cartridge according to claim 2, wherein the at least one upwardly protruding member of the second adjacent razor blade assembly is configured to engage a second main surface of a blade support of the intermediate razor blade assembly.

5. The razor cartridge according to claim 2, wherein the bottom cover comprises a support surface configured to engage and support a second main surface of the blade support of the second adjacent razor blade assembly.

6. The razor cartridge according to claim 1, wherein the at least one upwardly protruding member protrudes a same distance from the first main surface as the at least one downwardly protruding member protrudes from the second main surface.

7. The razor cartridge according to claim 1, wherein the multiple razor blades assemblies are arranged on the multiple steps of the bottom cover to position each razor blade at a distance relative to adjacent razor blade(s).

8. The razor cartridge according to claim 7, wherein the distance between each razor blade and the adjacent razor blade(s) is equal to the distance that the at least one upwardly protruding member protrudes from the first main surface and the at least one downwardly protruding member protrudes from the second main surface.

9. The razor cartridge according to claim 1, wherein
the blade support comprises a first side configured to face a step of the multiple steps and a second side opposite to the first side;
the at least one upwardly protruding member is arranged in connection with the first side; and
the at least one downwardly protruding member is arranged in connection with the second side.

10. The razor cartridge according to claim 9, wherein
at least a portion of the first side of the blade support is bent to form the at least one upwardly protruding member; and
at least a portion of the second side of the blade support is bent to form the at least one downwardly protruding member.

11. The razor cartridge according to claim 9, wherein the blade support comprises at least one support member attached to the razor blade.

12. The razor cartridge according to claim 11, wherein at least one support member extends from the second side of the blade support.

13. The razor cartridge according to claim 11, wherein the blade support comprises multiple support members and multiple downwardly protruding members.

14. The razor cartridge according to claim 13, wherein the blade support comprises alternating support members and downwardly protruding members.

15. The razor cartridge according to claim 13, wherein the blade support comprises slotted openings between adjacent support members and downwardly protruding members.

16. The razor cartridge according to claim 1, wherein the blade support comprises at least one spring member configured to engage a step of the multiple steps.

17. The razor cartridge according to claim 16, wherein the at least one spring member comprises at least one elongated segment forming at least one laterally extending slotted opening in the blade support.

18. The razor cartridge according to claim 17, wherein
the blade support comprises two spring members; and
the at least one upwardly protruding member is arranged between the two spring members.

19. The razor cartridge according to claim 16, wherein a respective blade exposure of each razor blade of the multiple razor blade assemblies is individually controllable.

20. The razor cartridge according to claim 1, wherein the housing comprises:

an elongated blade receiving region defined between two end walls spaced from each other along a first axis and between two side walls spaced from each other along a second axis perpendicular to the first axis; and blade-receiving slots in the end walls and extending along a third axis that is perpendicular to the first axis and angled at an angle larger than 0° but smaller than 90° to the second axis.

21. The razor cartridge according to claim 20, wherein the multiple steps extend along the third axis.

22. The razor cartridge according to claim 1, wherein the bottom cover is releasably attached to the housing.

23. The razor cartridge according to claim 1, wherein the bottom cover comprises at least one channel extending through a thickness of the bottom cover.

24. A razor, comprising:

a razor handle; and the razor cartridge according to claim 1 connected to the razor handle.

* * * * *